(12) United States Patent
Ho

(10) Patent No.: US 8,621,743 B2
(45) Date of Patent: Jan. 7, 2014

(54) METHOD FOR MANUFACTURING LENS WITH LIGHT SHIELD

(75) Inventor: Hung-Lung Ho, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 241 days.

(21) Appl. No.: 13/326,251

(22) Filed: Dec. 14, 2011

(65) Prior Publication Data

US 2013/0062797 A1 Mar. 14, 2013

(30) Foreign Application Priority Data

Sep. 13, 2011 (TW) .............................. 100132786 A

(51) Int. Cl.
*B23P 17/00* (2006.01)

(52) U.S. Cl.
USPC ......... 29/527.1; 29/527.4; 264/1.7; 264/1.32; 264/2.5

(58) Field of Classification Search
CPC ....................................................... C23C 4/00
USPC .............. 29/527.1, 527.4; 72/379.2; 264/1.7, 264/1.32, 2.5; 359/771, 811, 819; 362/259; 396/529; 427/164
See application file for complete search history.

(56) References Cited

U.S. PATENT DOCUMENTS

| | | | | |
|---|---|---|---|---|
| 5,453,876 A * | 9/1995 | Hamada | ........................ | 359/625 |
| 6,373,634 B1 * | 4/2002 | Nishikawa | .................... | 359/619 |
| 6,421,103 B2 * | 7/2002 | Yamaguchi | ..................... | 349/61 |
| 6,599,385 B1 * | 7/2003 | Liao et al. | .................. | 156/272.2 |
| 6,707,613 B2 * | 3/2004 | Fujimoto et al. | .............. | 359/622 |
| 6,897,911 B2 * | 5/2005 | Yamaguchi | ..................... | 349/57 |
| 7,852,577 B2 * | 12/2010 | Kikuchi et al. | ............... | 359/819 |
| 8,369,033 B2 * | 2/2013 | Oh et al. | ........................ | 359/796 |
| 8,379,084 B2 * | 2/2013 | Hirai | ............................. | 348/143 |
| 2010/0178614 A1 * | 7/2010 | Hwang et al. | ................. | 430/321 |
| 2012/0177819 A1 * | 7/2012 | Lee et al. | ....................... | 427/164 |

* cited by examiner

Primary Examiner — Alexander P Taousakis
(74) Attorney, Agent, or Firm — Altis Law Group, Inc.

(57) ABSTRACT

A method for manufacturing a lens includes: providing a metal sheet and a stamping mold; forming a light shield of a predetermined shape and size from the metal sheet using the stamping mold; providing an injection mold, the injection mold defining a mold cavity, the mold cavity defining a molding surface that corresponds to the light shield in shape and size; placing the light shield in the mold cavity, wherein the light shield is pasted to the molding surface; and forming a lens with the light shield using the injection mold.

10 Claims, 5 Drawing Sheets

METHOD FOR MANUFACTURING LENS WITH LIGHT SHIELD

BACKGROUND

1. Technical Field

The present disclosure relates to lenses and, particularly, to a method for manufacturing a lens with a light shield.

2. Description of Related Art

Lenses include an optical portion for forming images and a non-optical portion surrounding the optical portion for assembling of the lenses and flares are often introduced into the images formed by the optical portion by the non-optical portion the non-optical portion directs undesired light rays to the images. As such, light shields are made and attached/pasted to the non-optical portion. However, some non-optical portions may have a tapering surface of a high tapering degree for obtaining some specific properties, which makes it difficult to attach/paste the light shield to such the tapering surface.

Therefore, it is desirable to provide a method for manufacturing a lens, which can overcome the above-mentioned problems.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

Embodiments of the present disclosure will now be described in detail with reference to the drawings.

Figure 1:
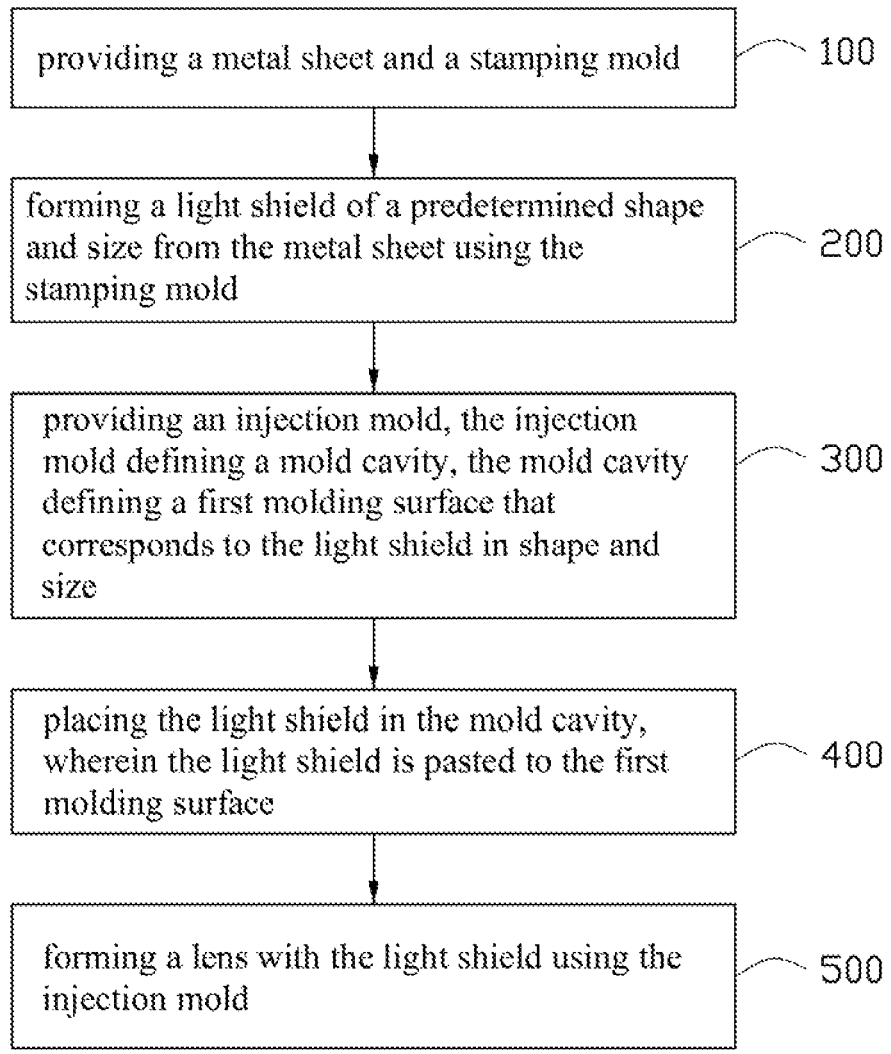
FIG. 1 is a flowchart of a method for manufacturing a lens, according to an embodiment.

Referring to FIG. 1, a method for manufacturing a lens includes the following steps 100-400.

Figure 2:
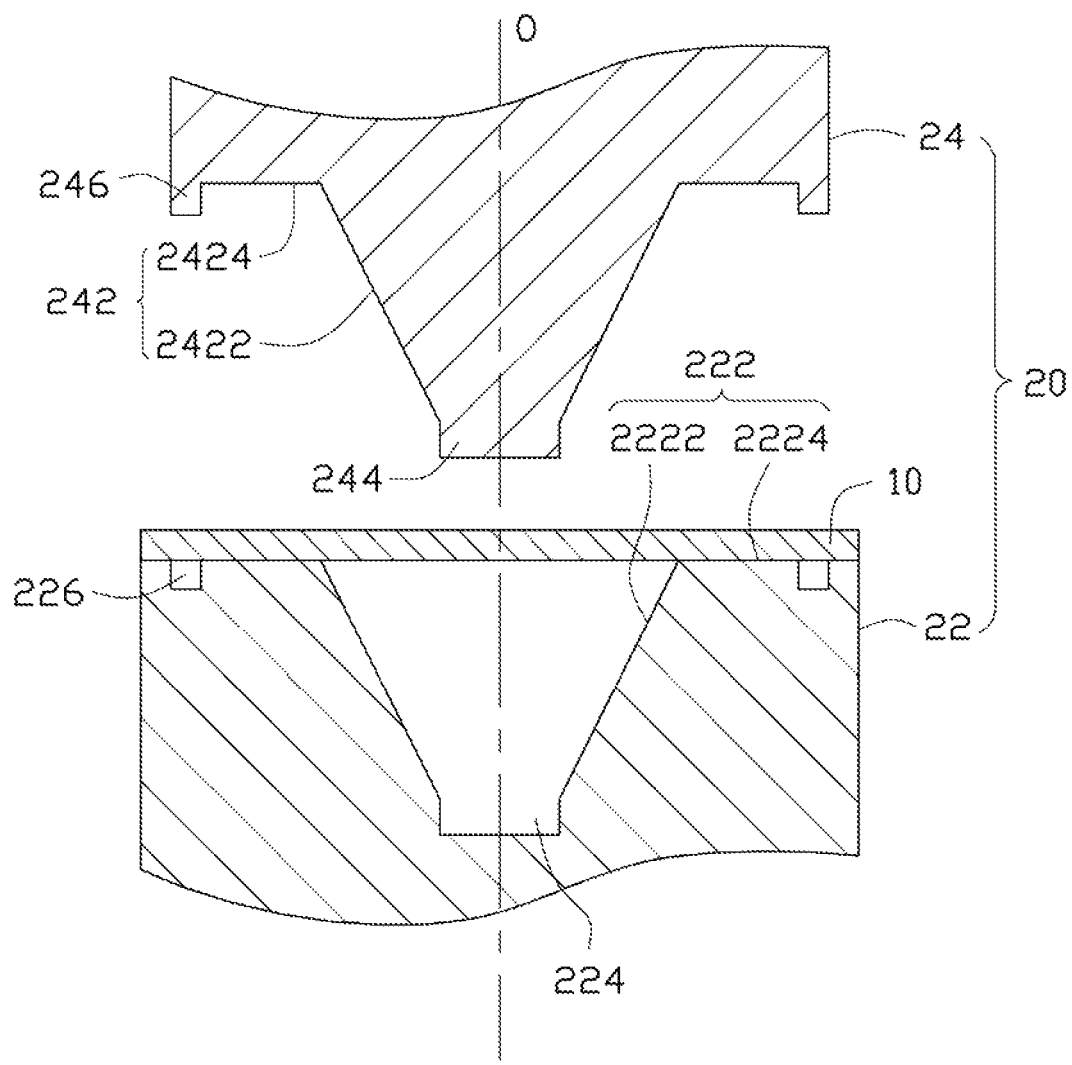
FIG. 2 is a cross-sectional view of a metal sheet and a stamping mold used in the method of FIG. 1, according to the embodiment.

Also referring to FIG. 2, in the step 100, a metal sheet 10 and a stamping mold 20 are provided.

The metal sheet 10 is made of light-shield stainless steel. A thickness of the metal sheet 10 is set depending on requirements.

The stamping mold 20 includes a base 22 and a press 24. The base 22 forms a first shaping surface 222. The press 24 includes a second shaping surface 242. The press 24 is movably set facing the base 22. The second shaping surface 242 is aligned with the first shaping surface 242. The first shaping surface 222 and the second shaping surface 242 shape the metal sheet 10 as desired by pressing the metal sheet 10 into the base 22 using the press 24.

In this embodiment, the first shaping surface 222 includes a first annular surface 2224 facing the press 24 and an inner tapering surface 2222 tapering from an inner edge of the first annular surface 2224 with a predetermined tapering degree, for example, 1:2.

The base 22 also defines a first blade groove 224 and a second blade groove 226. The first blade groove 224 is a circular sunken area connecting with an inner edge of the tapering surface 2222. The second blade groove 226 is an annular sunken area connecting with a periphery of the first annular surface 2224.

The second shaping surface 242 includes a second annular surface 2424 facing the base 22 and an outer tapering surface 2422 tapering from an inner edge of the second annular surface 2424 with the predetermined tapering degree of the inner tapering surface 2222. The second annular surface 2424 corresponds to the first annular surface 2224 and the outer tapering surface 2422 corresponds to the inner tapering surface 2222 in position, shape, and size.

The press 24 also includes a first blade 244 and a second blade 246. The first blade 244 is a circular protrusion protruding from a tapered end of the outer tapering surface 2422 and corresponds to the first blade groove 224 in shape and position. The second blade 246 is an annular protrusion surrounding a periphery of the second annular surface 2424 corresponding to the second blade groove 226.

Figure 3:
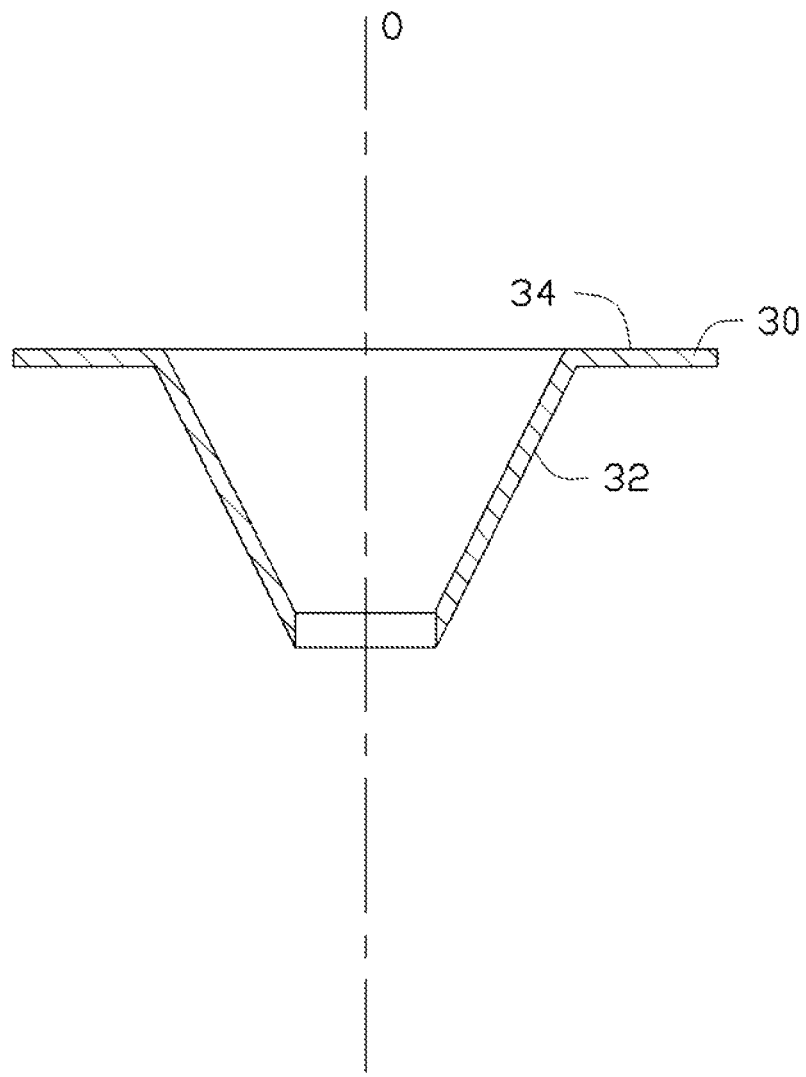
FIG. 3 is a cross-sectional view of a light shield made by the method of FIG. 1, according to the embodiment.

Referring to FIG. 3, in the step 200, the metal sheet 10 is stamped by the stamping mold 20 to form a light shield 30 of a predetermined shape and size (e.g., tapering with the predetermined tapering degree).

In particular, in step 200, the metal sheet 10 is placed on the base 22 and the press 24 is driven to move towards the base 22 to stamp the metal sheet 10 into the base 22. The first shaping surface 222 and the second shaping surface 242 cooperatively shape the metal sheet 10, obtaining the predetermined shape of the light shield. The first blade 244 and the second blade 246 stamp into the first blade groove 224 and the second blade groove 226, respectively, cutting the metal sheet 242 and thus obtaining the predetermined size of the light shield 30. As such, the light shield 30 includes an attachable surface 32 shaped by the inner tapering surface 2222 and the outer tapering surface 2422 and a shield surface 34 shaped by the first annular surface 2224 and the second annular surface 2424.

Figure 4:
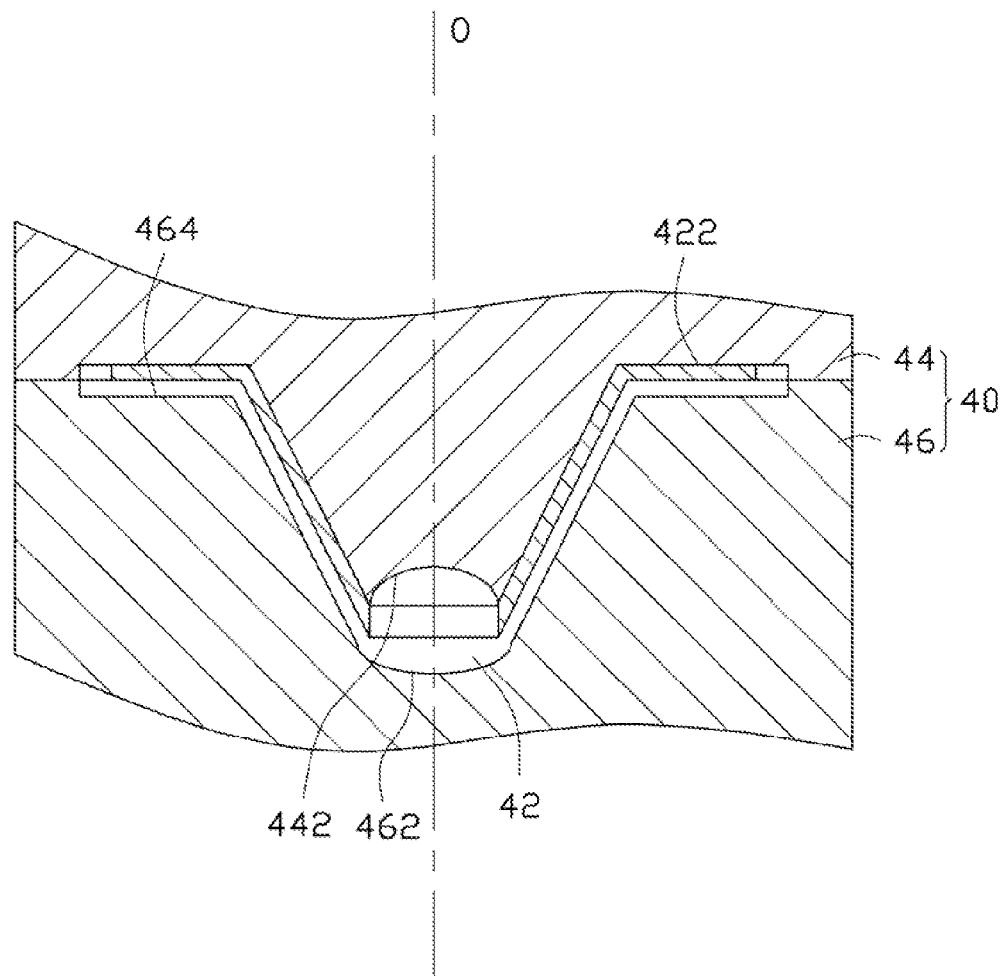
FIG. 4 is a cross-sectional view of the light shield of FIG. 3 and an injection mold used in the method of FIG. 1, according to the embodiment.

Referring to FIG. 4, in the step 300, an injection mold 40 is provided.

The injection mold 40 defines a mold cavity 42 which defines a first molding surface 422 corresponding to the light shield 30 in shape and size. In particular, the injection mold 40 includes a core mold 44 and a cavity mold 46. The first molding surface 422 is formed on the core mold 44. The core mold 44 also forms a second molding surface 442 which is surrounded by the first molding surface 422. The cavity mold 46 forms a third molding surface 462 corresponding to the second molding surface 442 and a fourth molding surface 464 corresponding the first molding surface 422. The mold cavity 42 is bounded by the first molding surface 422, the second molding surface 442, the third molding surface 462, and the fourth molding surface 464.

In the step 400, the light shield 30 is placed into the mold cavity 42 and attached to the first molding surface 422.

Figure 5:
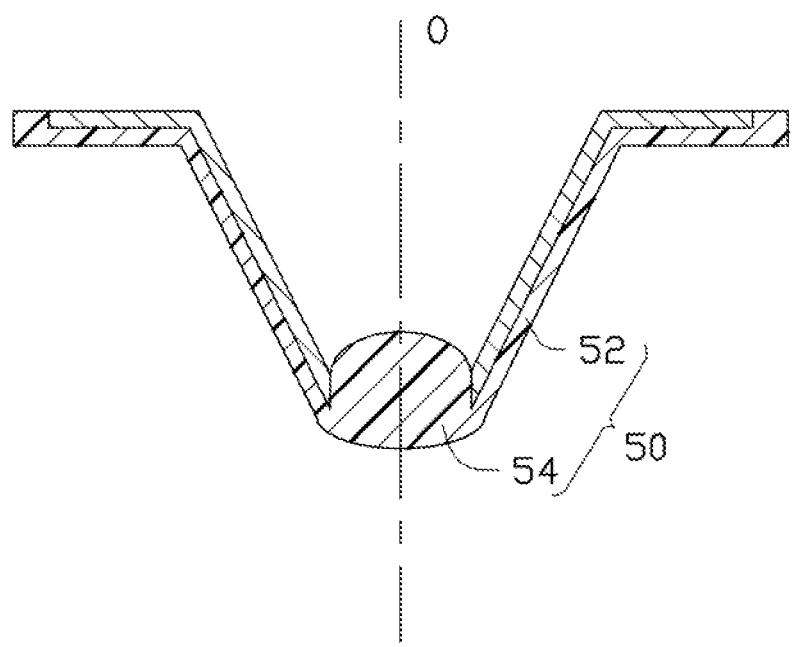
FIG. 5 is a cross-sectional view of a lens manufactured by the method of FIG. 1, according to the embodiment.

Referring to FIG. 5, in the step 500, a lens 50 is formed by injection molding implemented by the injection mold 40 with the light shield 30.

In particular, the lens 50 includes an optical portion 54 for forming images and a non-optical portion 52 surrounding the optical portion 54 and for assembling of the lens 50. The light shield 30 is buried in the non-optical portion 52 and with the shield surface 34 uncovered. The first molding surface 422 and the third molding surface 462 cooperatively mold the non-optical portion 52. The second molding surface 442 and the fourth molding surface 464 cooperatively mold the optical portion 54.

As such, the attachment of the light shield 30 to the lens 50 is facilitated.

It should be pointed out that FIGS. 2-5 only show cross-sections of the metal sheet 10, the stamping mold 20, the light shield 30, the injection mold 40, and the lens 50 which are taken along a surface passing the rational symmetry axis.

It will be understood that the above particular embodiments are shown and described by way of illustration only. The principles and the features of the present disclosure may be employed in various and numerous embodiment thereof without departing from the scope of the disclosure as claimed. The above-described embodiments illustrate the possible scope of the disclosure but do not restrict the scope of the disclosure.

What is claimed is:

1. A method for manufacturing a lens, comprising:
providing a metal sheet and a stamping mold;
forming a light shield of a predetermined shape and size from the metal sheet using the stamping mold;
providing an injection mold, the injection mold defining a mold cavity, the mold cavity defining a first molding surface that corresponds to the light shield in shape and size;
placing the light shield in the mold cavity, wherein the light shield is pasted to the first molding surface; and
forming a lens with the light shield using the injection mold.

2. The method of claim 1, wherein the metal sheet is a stainless steel.

3. The method of claim 1, wherein the stamping mold comprises a base and a press, the press is movably set facing the base and configured for pressing the metal sheet into the base to form the light shield.

4. The method of claim 3, wherein the base comprising a first shaping surface, the press comprises a second shaping surface, the second shaping surface is aligned with the first shaping surface, and the first shaping surface and the second shaping surface are configured for shaping the metal sheet into the predetermined shape of the light shield.

5. The method of claim 4, wherein the first shaping surface comprising a first annular surface facing the press and an inner tapering surface tapering from an inner edge of the first annular surface, the second shaping surface comprises a second annular surface facing the base and an outer tapering surface tapering from an inner edge of the second annular surface, the second annular surface corresponds to the first annular surface in position, shape, and size, and the outer tapering surface corresponds to the inner tapering surface in position, shape, and size.

6. The method of claim 5, wherein the base comprises a first blade groove and a second blade groove, the first blade groove is a circular sunken area connecting with a end of the inner tapering surface, the second blade groove is an annular sunken area connecting with a periphery of the first annular surface, the press comprises a first blade and a second blade, the first blade is a circular protrusion protruding from an end of the outer tapering surface and corresponds to the first blade groove in shape and position, and the second blade is an annular protrusion surrounding a periphery of the second annular surface and corresponds to the second blade groove in position, shape, and size.

7. The method of claim 1, wherein the light shield comprises an attachable surface pasted to the first molding surface and a shield surface connected to the attachable surface.

8. The method of claim 1, wherein the injection mold comprises a core mold and a cavity mold, the first molding surface is formed on the core mold, the core mold also forms a second molding surface which is surrounded by the first molding surface, the cavity mold comprises a third molding surface corresponding to the second molding surface and a fourth molding surface corresponding the first molding surface, and the mold cavity is bounded by the first molding surface, the second molding surface, the third molding surface, and the fourth molding surface.

9. The method of claim 8, wherein the lens comprises an optical portion and a non-optical portion, the second molding surface and the third molding surface cooperatively mold the optical portion, the first molding surface and the fourth molding surface cooperatively mold the non-optical portion.

10. The method of claim 9, wherein the light shield is buried in the non-optical portion.

* * * * *